United States Patent

Caldwell

[11] Patent Number: 5,117,414
[45] Date of Patent: May 26, 1992

[54] DRIVE MOTOR AND SPINDLE ASSEMBLY FOR AN OPTICAL DISK DRIVE

[75] Inventor: Marcus L. Caldwell, Colorado Springs, Colo.

[73] Assignee: Hewlett-Packard Company, Palo Alto, Calif.

[21] Appl. No.: 246,502

[22] Filed: Sep. 19, 1988

[51] Int. Cl.⁵ .............................. G11B 25/04
[52] U.S. Cl. ........................ 369/266; 369/263
[58] Field of Search .......... 369/262, 263, 265, 266, 369/267, 270, 271, 268, 258

[56] References Cited

U.S. PATENT DOCUMENTS

| | | | |
|---|---|---|---|
| 3,737,969 | 6/1973 | Pejcha | 29/203 |
| 3,938,192 | 2/1976 | Caletti | 360/133 |
| 4,135,721 | 10/1979 | Camerik | 274/179 |
| 4,194,743 | 3/1980 | Ohsawa | 369/266 |
| 4,326,284 | 4/1982 | Elliott | 369/77 |
| 4,340,955 | 7/1982 | Elliott | 369/213 |
| 4,517,617 | 5/1985 | Tsuji et al. | 360/133 |
| 4,545,046 | 10/1985 | Jansen et al. | 369/111 |
| 4,570,194 | 2/1986 | Schatteman | 369/270 |
| 4,736,356 | 4/1988 | Konshak | 369/772 |
| 4,768,185 | 8/1988 | Camerik | 369/270 |
| 4,807,069 | 2/1989 | Okauchi et al. | 369/270 |
| 4,833,666 | 5/1989 | Gizen et al. | 369/265 |
| 4,853,041 | 3/1987 | Foote | 369/266 |

Primary Examiner—William M. Shoop, Jr.
Assistant Examiner—John W. Cabeca

[57] ABSTRACT

A disk drive motor and spindle assembly includes a drive motor having a drive shaft defining an axis of rotation, a centering hub, and a flat spiral spring. The centering hub has a spherical disk-receiving surface section about a sphere center and a cavity extending therein from its lower edge. The spiral spring mounts the centering hub with respect to the drive shaft with the sphere center located on the axis of rotation and in the plane of the spring.

10 Claims, 3 Drawing Sheets

DRIVE MOTOR AND SPINDLE ASSEMBLY FOR AN OPTICAL DISK DRIVE

BACKGROUND OF THE INVENTION

1. Field of the Invention.

The present invention relates generally to optical disk drives. In particular, the present invention is a drive motor and spindle assembly for centering an optical disk on an axis of rotation within an optical disk drive.

2. Description of the Prior Art.

The demand for mass data storage continues to increase with expanding data processing operations and personal computer use. Optical data storage systems are becoming an increasingly popular means for meeting this need. With systems of this type, extremely large quantities of data can be stored and quickly accessed at relatively low cost.

Optical data storage systems include an optical disk for storing information in digital form. Optical disk drives utilize a circular rotating disk with one or more recording surfaces. Data is recorded on spiral or concentrically positioned tracks centered about the disk's axis of rotation. The disk is loaded into an optical disk drive which includes mechanical, electrical and optical systems required to write data to and read data from the optical disk. A feature of those systems is a recording head which is moved radially across the disk to access the track that data is to be written to or read from.

Magnetic data storage systems which use magnetic disks are well known. Magnetic disks have a relatively low density of concentric recording tracks. Because of the relatively low density of recording tracks on magnetic disks, disk alignment with respect to the rotational axis of the drive unit requires only moderate precision to ensure acceptable alignment of the recording head over the desired recording track.

The optical data disks used in conjunction with optical disk drives have a very high density of recording tracks. Higher performance tracking systems are therefore required to keep the optical read/write head centered on the desired servo track. Track runout, the radial displacement of the servo tracks while the disk is rotated, must be kept to a minimum. One method for reducing runout is to accurately center the disk on the rotational axis of the drive unit.

A variety of spindle assemblies for centering optical disks on their drive motors are known. One spindle assembly includes a cup having a lip which forms a receiving platform for the optical disk. The cup contains a magnet which holds the disk in contact with the lip. A vertically movable and conically shaped centering hub having inclined side surfaces is positioned within the cup and is concentric therewith. The centering hub is biased upward by a helical compression spring positioned around the drive shaft of the motor. The optical disk used with this mechanism includes a mounting hub concentrically positioned about its mounting hole. When the disk is placed on the spindle assembly its position is determined by the contact of its mounting hub with the centering hub. Magnetic attraction between the magnet in the cup and the mounting hub of the disk cause the disk and centering hub to move downward until the disk makes contact with the lip.

The helical compression spring in the above-described spindle assembly requires relatively high tolerances so that the centering hub deflects accurately and keeps the disk centered on the rotational axis of the drive motor. The higher the tolerances to which this and other parts must be manufactured, the higher their cost. It is expensive and time consuming to accurately center the mounting hub on the disk during its manufacture. Clamping the mounting hub on the disk also compresses the disk and increases the likelihood of birefringence which results in optical distortion.

Another spindle assembly includes a cup-shaped hub concentrically mounted about the shaft of a drive motor, and a conically tipped centering pin extending from the hub coaxial with the shaft. Optical disks used with this spindle assembly have a mounting hub with a pin-receiving hole concentrically clamped to the disk. A ring magnet mounted on the spindle hub around the centering pin holds the mounting hub and disk on the spindle assembly. This spindle assembly suffers from some of the same problems as that discussed above. Tolerances of the spindle centering pin and hole in the disk hub must be relatively high to keep runout to acceptable levels. The centering pin and disk hub hole are also subject to wear which can increase runout.

The Elliott U.S. Pat. No. 4,326,284 discloses a video disk player with a record centering spindle. The spindle is cone shaped and disposed on a shaft of the drive motor. The spindle is biased toward a raised position by a bias spring in the spindle shaft. Other spindle assemblies are disclosed in the following U.S. patents: Konshak U.S. Pat. No. 4,736,356, Tsuji U.S. Pat. No. 4,517,617, Camerik U.S. Pat. No. 4,135,721, Jansen et al. U.S. Pat. No. 4,545,046 and Caletti U.S. Pat. No. 3,938,192. None of them, however, appear to provide a centering mechanism that is free of all the problems discussed above.

It is evident that there is a continuing need for improved optical disk spindle assemblies. An easy to manufacture and inexpensive drive motor and spindle assembly which can accurately center a disk and has a relatively low sensitivity to wear is needed. The drive motor and spindle assembly should be small enough for use in conjunction with half-height drives which fit standard personal computers.

SUMMARY OF THE INVENTION

A drive motor and spindle assembly in accordance with the present invention includes a drive motor having a drive shaft defining an axis of rotation, and a centering hub having a spherical disk-receiving surface section about a sphere center. Resilient mounting means resiliently mount the centering hub with respect to the drive shaft with the sphere center coaxial with the axis of rotation.

In preferred embodiments the drive motor includes a stator, bearing means for rotatably mounting the drive shaft within the stator, and a rotor and hub frame mounted to an end of the drive shaft. The resilient mounting means includes a flat spiral spring. The centering hub has a cavity extending therein from its lower edge, and is mounted to a center section of the flat spring with its sphere center located in the plane of the spring. An rotor end hub frame such that the drive shaft extends into the cavity of the centering hub.

The drive motor and spindle assembly of the present invention is relatively easy and inexpensive to manufacture. The centering hub will present a spherical disk-contacting area centered about the rotational axis even if deflected downward or rotated from side-to-side. The compact nature of the drive motor and spindle assembly facilitates its use in a half-height drive.

DETAILED DESCRIPTION OF THE PREFERRED EMBODIMENTS

Figure 1:
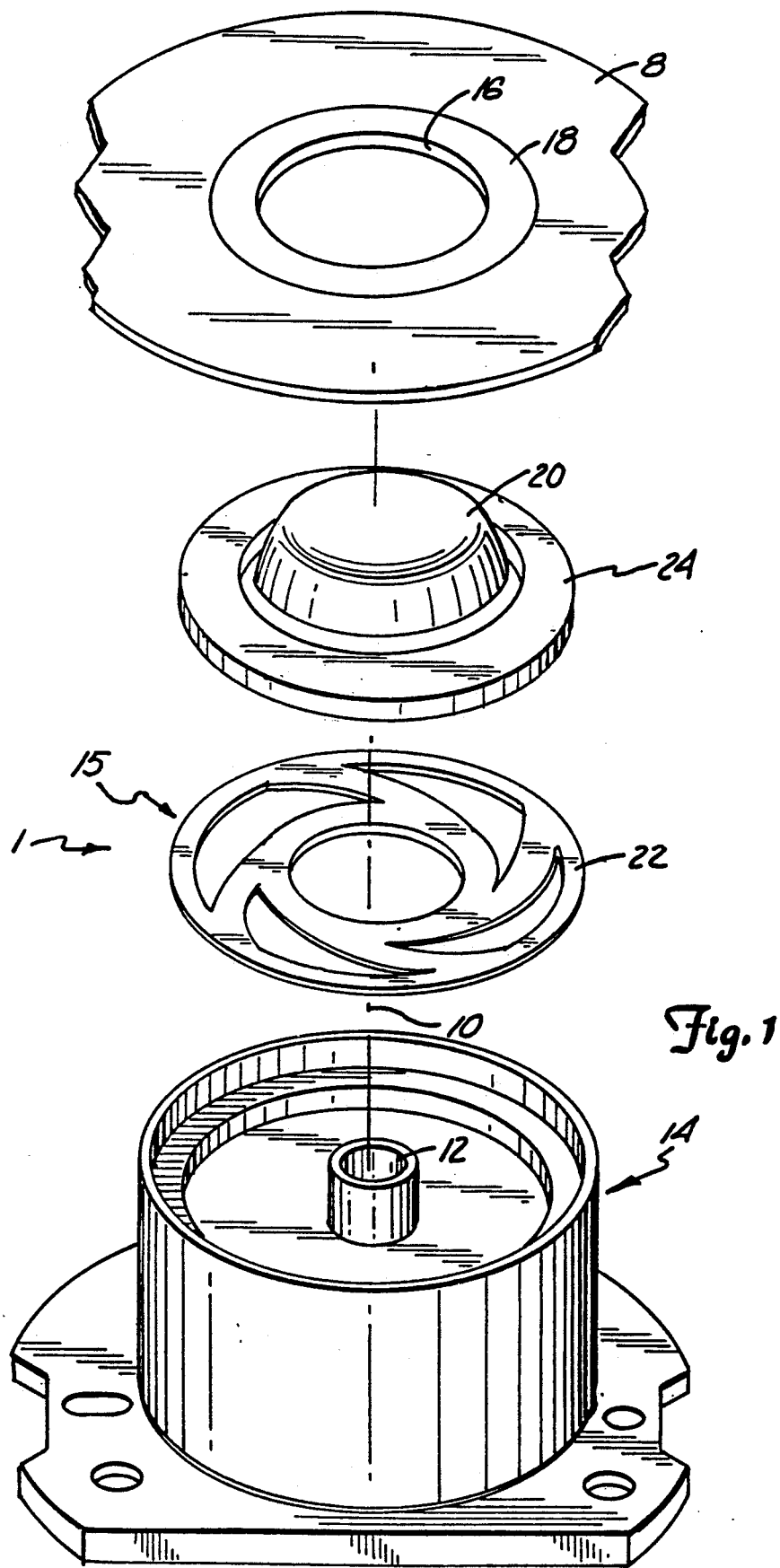
FIG. 1 is an exploded perspective view of the drive motor and spindle assembly of the present invention, as well as an optical disk used therewith.

A drive motor and spindle assembly 1 in accordance with the present invention, as well as an optical disk 8 with which it is used, are illustrated in exploded perspective form in FIG. 1. Drive motor and spindle assembly 1 includes a drive motor 14 and a spindle assembly 15 mounted to the drive motor. Spindle assembly 15 is utilized to center optical disk 8 on an axis of rotation 10 defined by drive shaft 12 of drive motor 14. A mounting hole 16 extends through the center of disk 8. Concentrically positioned around mounting hole 16 is a disk hub 18. Disk hub 18 is a metallic ring in the embodiment shown, and can be integrally manufactured into optical disk 8, or subsequently attached thereto. Mounting hole 16 of optical disk 8 is received by a spherical section centering hub 20 which is mounted to drive motor 14 by a flat spiral spring 22. A ring magnet 24 mounted about centering hub 20 magnetically cooperates with disk hub 18 to hold optical disk 8 on drive motor 14.

Figure 2:
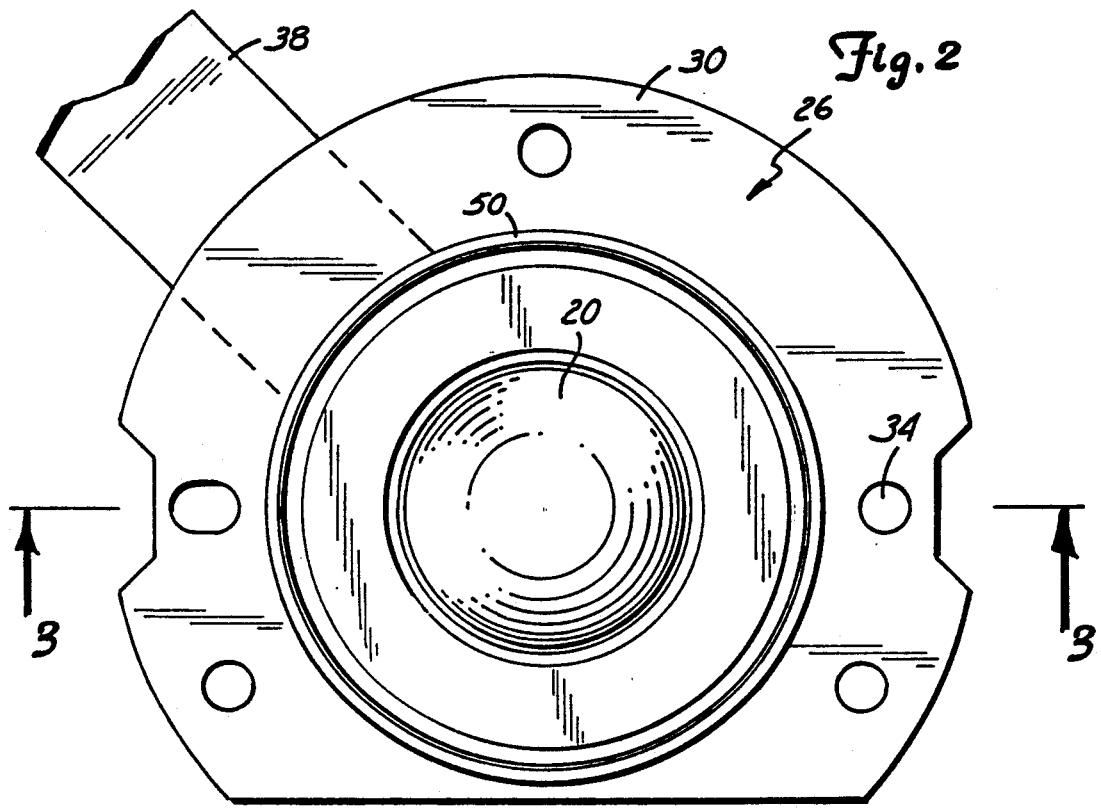
FIG. 2 is a top view of the drive motor and spindle assembly shown in FIG. 1.
Figure 3:
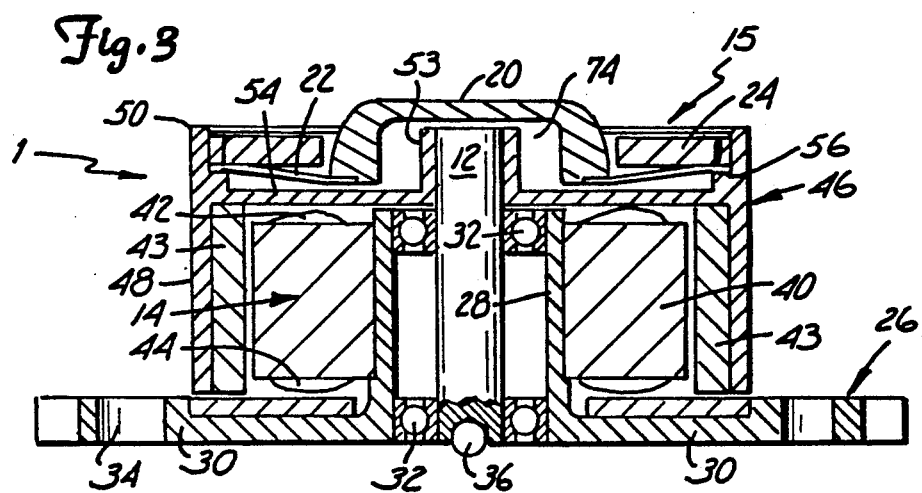
FIG. 3 is a cross-sectional view of the drive motor and spindle assembly, taken along lines 3—3 in FIG. 2.

Drive motor 14 and spindle assembly 15 are also illustrated in FIGS. 2 and 3. Motor 14 includes a frame 26 having a cylindrical member 28 and mounting base 30. Drive shaft 12 is rotatably mounted within cylindrical member 28 of frame 26 by bearings 32. Mounting base 30 is disk shaped and extends radially from a first or lower end of drive shaft 12 and cylindrical member 28. Mounting holes 34 extend through mounting base 30 about its outer periphery, and are used to mount drive motor and spindle assembly 1 within an optical disk drive (not shown). A ground button 36 is located at the lower end of drive shaft 12. A flex lead 38 through which power is supplied to the motor 14 is also shown.

Stator coil 40 is circumferentially mounted about an exterior surface of cylindrical member 28 and has a top end 42 and a bottom end 44. A rotor and spindle hub frame 46 includes a cylindrical mounting section 53, a radially extending support member 54, and a cylindrical member 48 mounted between its opposite ends to an outer edge of support member 54. Mounting section 53 is press fit onto an upper or second end of drive shaft 12 to securely hold frame 46 thereon. In the embodiment shown, support member 54 is a generally planar member which extends outward from a lower edge of mounting section 53 adjacent top end 42 of stator coil 40. A rotor section of cylindrical member 48 extends downward from support member 54 adjacent stator coil 40 and between its coil ends 42 and 44. As shown, rotor magnets 43 are mounted to the inside surface of the rotor section of cylindrical member 48. A spindle hub section of cylindrical member 48 extends from support member 54 in a direction generally parallel to drive shaft 12. The spindle hub section has an upper edge 50, and a ledge 56 which extends around the inside surface of the hub section between edge 50 and support member 54.

Figure 4:
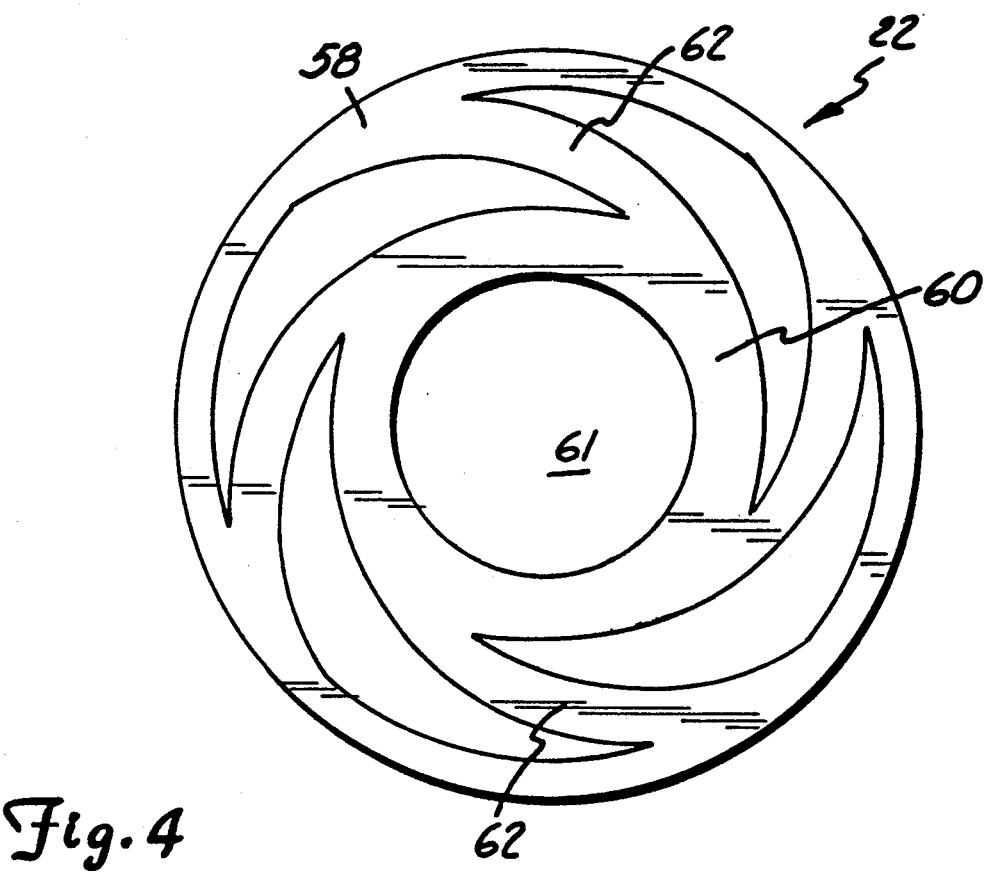
FIG. 4 is a detailed top view of the flat spiral spring shown in FIG. 1.

Flat spiral spring 42 is perhaps best shown in FIG. 4. Spiral spring 42 includes a generally circular outer member 58 and a generally circular inner member 60 which are concentrically positioned with respect to one another. Connecting the outer member 58 to the inner member 60 are spiral members 62 which extend partially around a circumference of the inner member. Inner member 60 includes a circular aperture 61 for receiving centering hub 20. The outer circumference of outer member 58 is circular, and sized to be received by ledge 56 of the spindle hub section of frame 46. Aperture 61 is centered around drive shaft 12. Spring 22 can be manufactured in one piece using chemical etching techniques.

Figure 5:
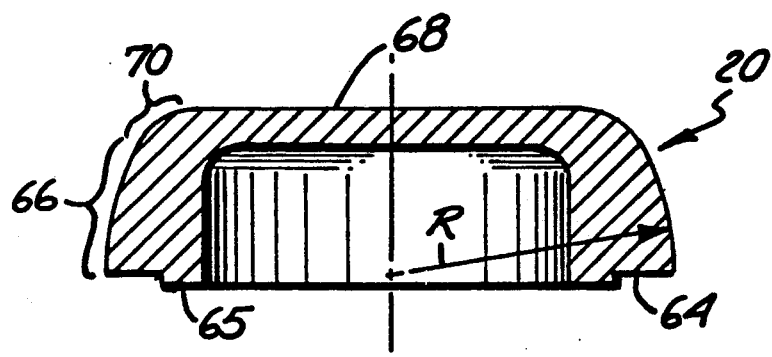
FIG. 5 is a detailed cross-sectional view of the centering hub shown in FIG. 1.

As shown in FIG. 5, centering hub 20 includes a spherical section 66 having a spherical exterior surface of radius R, a flat lower edge 64, a flat upper edge 68, and a tapered section 70 which couples spherical section 66 to upper edge 68. Hub 20 is a section of a half sphere in the embodiment shown, and has a radius R at lower edge 64. Radius R is selected as a function of the size of mounting hole 16 so optical disk 8 will ride on spherical section 66 when positioned on hub 20. The radius of curvature of tapered section 70 is smaller than radius R to provide a smooth transition between spherical section 66 and upper edge 68. A circular mounting rim 65 having a radius less than radius R and equal to the radius of aperture 61 in spring 22 extends from lower edge 64. As shown, centering hub 20 also includes a cavity 74 extending into its interior from lower edge 64.

Centering hub 20 is attached to flat spiral spring 22 with rim 65 extending through aperture 61. Outer member 58 of spring 22 is mounted to ledge 56. As best shown in FIG. 3, ledge 56 is positioned on cylindrical member 48 at a location permitting the upper end of drive shaft 12 to extend into the cavity 74 of centering hub 22, yet permit downward deflection of the centering hub. When centering hub 20 and flat spring 22 are mounted the manner described above, the spherical center of spherical section 66 will be positioned at the plane of flat spring 22 and coaxially aligned with rotational axis 10 of drive shaft 12. Magnet 24 is mounted to ledge 56, above spring 22. The upper surface of magnet 24 is preferably below edge 50.

The mounting configuration described above optimizes the amount of space available in the disk drive for a given height profile of drive motor 14 and its drive shaft 12. The optimization occurs because centering hub 20 is not entirely above the drive shaft 12. Flat top edge 68 of centering hub 20 also helps minimize the height of spindle assembly 20.

When optical disk 8 is positioned on spindle assembly 15, disk mounting hole 16 contacts the exterior surface of spherical section 66 of centering hub 20. The contact area will be in the form of a circle. The center of this contact area circle is coaxial with the axis of rotation 10. After the optical disk 8 contacts the centering hub 20, the optical disk is pulled downward by the magnetic attraction between its hub 18 and magnets 24 until the disk rests on edge 50 of cylindrical member 48. Flat spiral spring 22 also deflects downward as optical disk 8 is forced into engagement with edge 50.

The center of the spherical section 66 of centering hub 20 remains coaxial with axis of rotation 10 as it is deflected downward, or rotated from side-to-side by disk 8. This is an inherent characteristic of this design because spiral members 62 twist in torsion as inner member 60 is deflected either axially or rotationally with respect to outer member 58. Even if centering hub 20 is tilted slightly as it is deflected, spherical section 66 will still present a circular disk-contacting area which is centered on rotational axis 10.

Drive motor 14 and spindle assembly 15 are relatively easy and inexpensive to manufacture. Since mounting hole 16 of disk 18 is used in conjunction with spindle assembly 15 for centering purposes, the expense and detrimental effects of accurately mounting disk hub 18 to disk 8 are avoided. Accurate centering of disk 8 by spindle assembly 15 is also relatively insensitive to thermal effects on hub 20 and wear of mounting hole 16.

Although the present invention has been described with reference to preferred embodiments, workers skilled in the art will recognize that changes may be made in form and detail without departing from the spirit and scope of the invention.

What is claimed is:

1. A drive motor and spindle assembly for a disk drive, comprising:
   a drive motor having a drive shaft defining an axis of rotation;
   a centering hub having a spherical disk-receiving and supporting surface section about a sphere center; and
   resilient mounting means for resiliently mounting the centering hub with respect to the drive shaft with the sphere center coaxial with the axis of rotation;
   wherein the drive motor includes:
      a stator;
      bearing means for rotatably mounting the drive shaft within the stator; and
      a rotor and hub frame mounted to an end of the drive shaft, wherein the centering hub and resilient mounting means are mounted to the rotor and hub frame adjacent the end of the drive shaft.

2. The drive motor and spindle assembly of claim 1 wherein:
   The centering hub has a cavity extending therein; and
   the rotor and hub frame include means for mounting the resilient member and centering hub to the motor and hub frame with the drive shaft extending into the cavity in the centering hub.

3. The drive motor and spindle assembly of claim 1, wherein the rotor and hub frame include:
   a mounting member mounted to a first end of the drive shaft;
   a support member mounted to and extending from the mounting member; and
   a cylindrical member mounted to an outer edge of the support member concentric with the drive shaft and having a rotor section radially adjacent the stator and a hub section radially adjacent the first end of the drive shaft, the resilient mounting means and centering hub being mounted to the hub section.

4. The drive motor and spindle assembly of claim 3 wherein:
   the centering hub has a lower edge and a cavity extending therein; and
   the hub section of the rotor and hub frame includes ledge means for mounting the resilient mounting means in such a manner that the drive motor shaft extends into the cavity of the centering hub.

5. A drive motor and spindle assembly for a disk drive, comprising:
   a drive motor having a drive shaft defining an axis of rotation;
   a centering hub having a spherical disk-receiving and supporting surface section about a sphere center; and
   resilient mounting means for resiliently mounting the centering hub with respect to the drive shaft with the sphere center coaxial with the axis of rotation;
   wherein the resilient mounting means includes a generally flat resilient member;
   wherein the flat resilient member comprises a flat spring including:
      an inner member for receiving the centering hub;
      an outer member fixedly mounted with respect to the drive shaft; and
      a plurality of spiral members for concentrically mounting the inner member to the outer member.

6. The drive motor and spindle assembly of claim 5, wherein the flat spring is a one-piece spring.

7. A drive motor and spindle assembly for a disk drive, comprising:
   a drive motor having a drive shaft defining an axis of rotation;
   a centering hub having a spherical disk-receiving surface section about a sphere center; and
   a generally planar resilient member having an outer edge section fixedly mounted with respect to the drive shaft and a center section to which the centering hub is mounted with the sphere center located on the axis of rotation and in the plane of the resilient member;
   wherein the drive motor includes:
      a stator;
      bearing means for rotatably mounting the drive shaft in the stator; and
      a rotor and hub frame mounted to an end of the drive shaft, wherein the outer edge section of the resilient member is mounted to the rotor and hub frame adjacent the end of the drive shaft.

8. The drive motor and spindle assembly of claim 7 wherein the rotor and hub frame includes:
   a mounting member mounted to a first end of the drive shaft;
   a support member mounted to and extending from the mounting member; and
   a cylindrical member mounted to an outer edge of the support member concentric with the drive shaft and having a rotor section radially adjacent the stator and a hub section radially adjacent the first end of the drive shaft, the resilient member and centering hub being mounted to the hub section.

9. The drive motor and spindle assembly of claim 8 wherein the resilient member includes a flat spring including:
   the outer edge section;
   an inner member for receiving the centering hub; and
   a plurality of spiral members for concentrically mounting the inner member to the outer edge section.

10. The drive motor and spindle assembly of claim 9 wherein the flat spring is a one-piece spring.

* * * * *